US006338450B1

(12) United States Patent
Schwendinger

(10) Patent No.: US 6,338,450 B1
(45) Date of Patent: Jan. 15, 2002

(54) CABLE MANAGER FOR A RECHARGEABLE ELECTRIC VEHICLE

(76) Inventor: Jerry Schwendinger, P.O. Box 579, McDonough, GA (US) 30253

( * ) Notice: Subject to any disclaimer, the term of this patent is extended or adjusted under 35 U.S.C. 154(b) by 0 days.

(21) Appl. No.: 09/566,351

(22) Filed: May 8, 2000

(51) Int. Cl.[7] ............................................... B65M 75/36
(52) U.S. Cl. .............................. 242/388.9; 242/388.91; 191/12 R
(58) Field of Search ......................... 242/388.9, 388.91; 191/12 R; 254/337, 336, 392, 414

(56) References Cited

U.S. PATENT DOCUMENTS 127,789 A * 6/1872 Noble

* cited by examiner

Primary Examiner—Donald P. Walsh
Assistant Examiner—Jonathan R. Miller
(74) Attorney, Agent, or Firm—John L. James

(57) ABSTRACT

A cable manager has a support member and a bracket that mounts the support member to a ceiling joist of a golf cart shed. A first pulley wheel attaches to the top end of the support member, and a second pulley wheel attaches to a pulley mounting bracket. A coil spring entrained about the first pulley wheel has one end attached to the pulley mounting bracket and the other end attached to the bottom end of the support member. The second pulley wheel is suspended at a lower elevation than the first pulley wheel and moves down against the force of the spring when the power cable entrained over it is pulled down to connect to a golf cart for recharging. While recharging occurs, the lower pulley is fixed to the support member by attaching its bracket to an S-hook that attaches the spring to the vertical support member. When the power cable is released, the pulley moves up but its upward travel is limited by a cable bracket that captures the power cable and holds it in position for easy retrieval for the next use. The cable manager is suspended from the ceiling above the tops of the golf carts leaving the area floor area of obstructions for the golf cart.

19 Claims, 2 Drawing Sheets

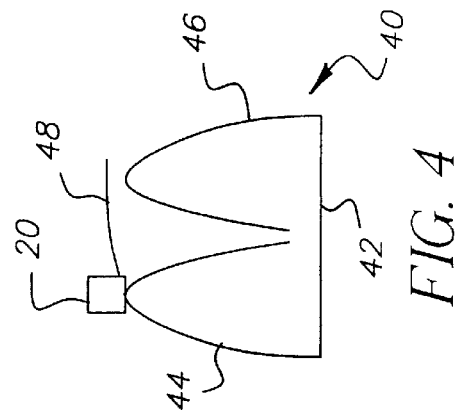
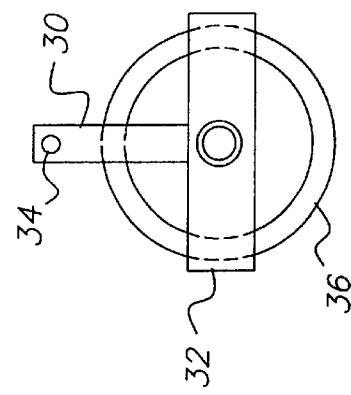
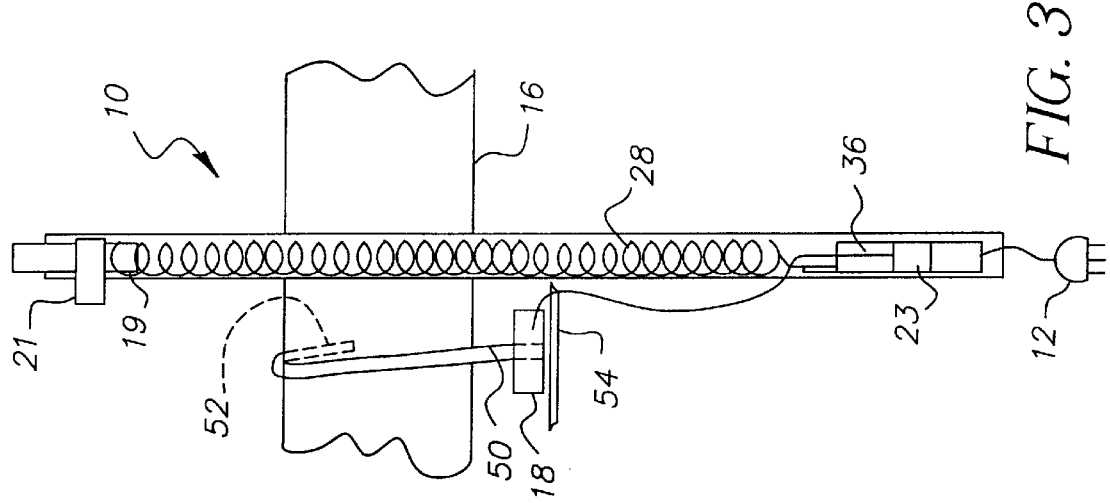

CABLE MANAGER FOR A RECHARGEABLE ELECTRIC VEHICLE

FIELD OF THE INVENTION

The present invention pertains to golf carts and other rechargeable electrical vehicles, and, more particularly, to a device to manage the power cable used to recharge such vehicles.

BACKGROUND OF THE INVENTION

Electric and hybrid electric vehicles for highway use are becoming more available. Off-road electric vehicles have been in popular use for a while. These vehicles are familiar as the vehicles for moving planes and equipment at airports. Perhaps the most familiar electric vehicle is the golf cart. All electric vehicles must have their batteries recharged periodically to maintain peak efficiency, and to extend the life of the battery. The vehicles are typically equipped with a receptacle for receiving a power cable from a battery charger. A battery charger delivers power at the voltage used by the vehicle so that the vehicle power system does not require a converter can remain relatively simple.

A problem with recharging golf carts is that a golf course needs to recharge several carts at one time each day. The carts are usually stored in a shed to protect them from the environment, and the shed is used for recharging each night. A number of battery chargers are located on the floor or on a bench or other structure on the floor which obstructs the floor area. To keep the floor area clear of these obstructions and thus more fully utilize the space, the battery charger can be suspended in the air with the power cable hanging down to the floor for use. While on the floor, the power cable often gets run over by the golf cart causing damage to the power cable. Accordingly, it will be appreciated that it would be highly desirable to have a device that keeps the power cable off the floor so that it is out of the path of the golf cart. When the power cord hangs down far enough to use for recharging a cart but not to the floor, it can still get in the way when not in use. It is desirable to have a device that keeps the power cable out of the path of the golf cart but that keeps the power cable close enough for convenient use when needed.

SUMMARY OF THE INVENTION

The present invention is directed to overcoming one or more of the problems set forth above. According to one aspect of the present invention, an apparatus comprises a support member having a top end portion and a bottom end portion; a first pulley wheel attached to the top end portion; a pulley mounting bracket; a second pulley wheel attached to the pulley mounting bracket; and a retractile member with a first end attached to the bottom end portion of the support member, a second end attached to the pulley mounting bracket, and a middle portion entrained about the first pulley wheel to suspend the second pulley wheel at a lower elevation than the first pulley wheel.

The second, lower pulley wheel moves down against the force of the spring when a power cable entrained over it is pulled down to connect to a vehicle for recharging. While recharging occurs, the lower pulley is fixed to the support member by attaching its bracket to an S-hook that attaches the spring to the vertical support member. The pulley moves up when the power cord is released but its upward travel is limited by a cable bracket that captures the power cable and holds it in position for easy retrieval for the next use.

According to another aspect of the present invention, an apparatus manages a power cable for recharging an electric vehicle in a building which has a ceiling joist. The apparatus comprises a vertical support member which has a top end portion and a bottom end portion with the top end portion defining first and second vertically spaced threaded bores and with the bottom end portion defining an opening. A mounting bracket has threaded members for engaging the threaded openings to mount the vertical support member. The mounting bracket is positioned on one side of the ceiling joist and the vertical support member is positioned on the other side of the ceiling joist so that the ceiling joist supports the vertical support member. A first pulley mounting bracket is fastened to the top end portion of the support member and a first pulley wheel is mounted on the first pulley mounting bracket. A second pulley wheel is mounted on a second pulley mounting bracket and the power cable is entrained about the second pulley wheel. A coil spring is entrained about the first pulley wheel. The spring has one end attached to the bottom end portion of the support member via the opening and has its other end attached to the second pulley mounting bracket. The second pulley wheel is suspended on the spring at a lower elevation than the first pulley wheel. A cable bracket is fastened to the bottom end portion of the vertical support member for engaging and holding the power cable. A mounting bracket has an inverted hook on one end and a platform on the other end. The hook is draped over the joist to support the platform and a battery charger on the platform containing the power cord.

These and other aspect, objects, features and advantages of the present invention will become more apparent from a study of the detailed description of the invention and by reference to the accompanying drawings.

BRIEF DESCRIPTION OF DRAWINGS

FIG. 3 is a diagrammatic front view of the cable manager and battery charger of FIG. 1.

FIG. 4 is a sectional view taken along line 4—4 of FIG. 3 illustrating a cable holder.

FIG. 5 is a left side view of the lower cable retracting wheel and associated bracket.

DETAILED DESCRIPTION OF THE PREFERRED EMBODIMENTS

Figure 2:
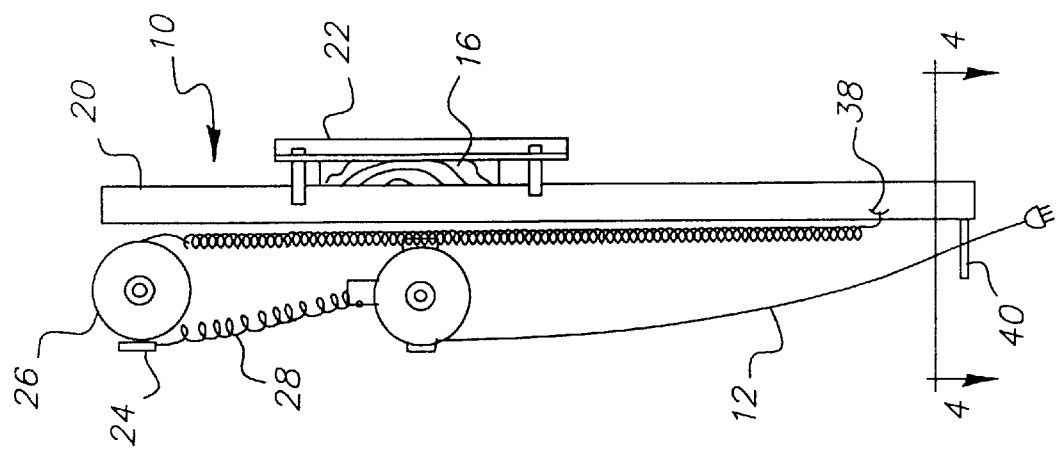
FIG. 2 is a diagrammatic right side view of a preferred embodiment the cable manager of FIG. 1.
Figure 1:
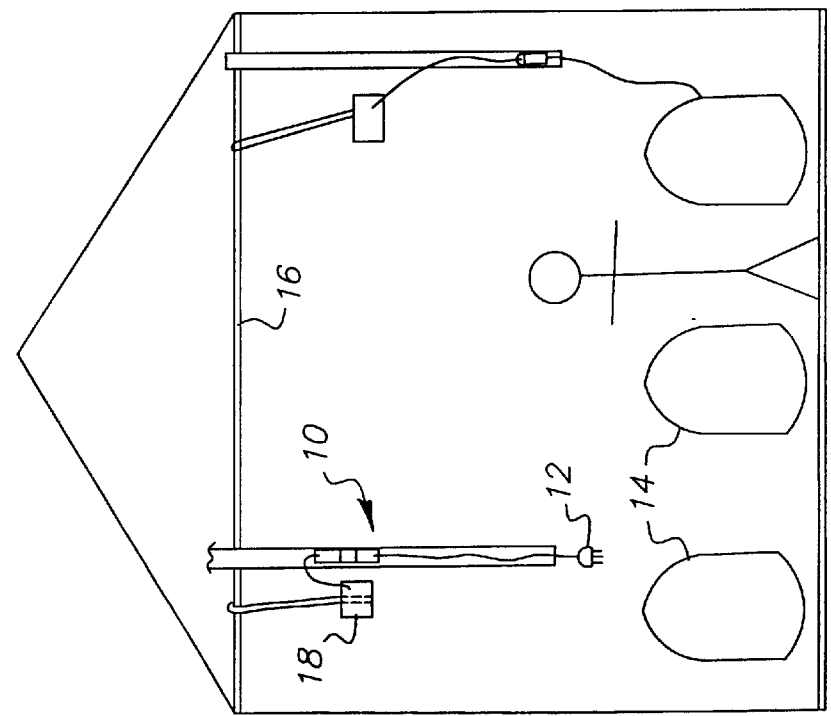
FIG. 1 is a diagram illustrating golf cart in a building with the cable manager according to the present invention.

Referring to FIG. 1, a cable manager 10 for managing a power cable 12 for recharging an electric vehicle, such as a golf cart 14, in a building is suspended from a ceiling joist 16 of the building. The cable manager 12 is suspended from the ceiling joist 16 along with the battery charger 18 leaving the floor area of the building completely free of obstructions for the golf cart 14. The lowest point of the cable manager 12 is above the top of the cart 14 but in easy reach for recharging. Because the cable manager is above the top of the cart, the can freely traverse the building.

Referring to FIGS. 1–5, a vertical support member 20 has a top end portion and a bottom end portion and is preferably constructed of steel or other metal, but wood or plastic can be used. Support member 20 is preferably a length of square or rectangular steel tubing, but other cross-sectional configurations can be used. Strength and rigidity are not critical for support member 20 because it is positioned above the pathway of the golf cart. The top end portion of support member 20 defines first and second vertically spaced threaded bores, while the bottom end portion of support member 20 defines an unthreaded bore.

A mounting bracket 22 has threaded bolts for engaging said threaded openings to mount vertical support member 22 on roof joist 16. In lieu of roof joist 16 a dropped ceiling can be used, in which case, the joists or cross members of the dropped ceiling can be used. The mounting bracket 22 is positioned on one side of ceiling joist 16 while support member 20 is positioned on the other side of ceiling joist 16 so that the ceiling joist supports vertical support member 20. Preferably, the bolts extend through openings in bracket 22 to engage the threaded openings in support member 20. The two bolts need not pass through joist 16 to fasten to joist 16, they can form a compression joint which is preferred because it eliminated the need to drill holes in joist 16. Alternatively, joint 16 can be drilled to form bores for the bolts to pas through, in which case a single bolt could suffice.

A first pulley mounting bracket 24 is fastened the top end portion of support member 20 by welding or the like to support a first pulley wheel 26. Bracket 24 has a hub on which pulley wheel 26 is rotatably mounted. Bracket 24 can be formed of a flat piece of metal with one end fastened to support member 20 and its distal end bent ninety degrees. The bent distal end preferably aligns with the horizontal axis of pulley wheel 26 to keep a coil spring 28, or other retractile member, entrained about pulley wheel 26.

A second pulley mounting bracket is a T-shaped bracket with a vertical member 30 and a horizontal member 32. The T-shaped bracket is inverted so that the distal end of vertical member 30 extends upward from the connection of the horizontal and vertical members 32, 30. The distal end of vertical member 30 defines an opening 34. An S-hook is preferably used to attach coil spring 28 at opening 34. An S-hook is preferably used to attach the other end of coil spring 28 to opening 38, and comprises a means for releasably attaching the lower pulley to the bottom end portion the support member. An S-hook is preferred over a direct connection because it allows a degree of pivotal movement between spring 28 and bracket member 30. Both ends of horizontal member 32 are bent ninety degrees to keep power cable 12 entrained about a second pulley wheel 36 that is rotatably mounted on the second mounting bracket.

Coil spring 28 is long spring similar those conventionally used for screen door but longer. A 4-foot spring is believed to be sufficient where the ceiling height is about eight feet. The ends of coil spring 28 terminate with eye hooks easily engaged by S-hooks to attach via openings pulley mounting bracket 34 and support member 38. When entrained about the first pulley wheel 26 with one end attached to the bottom end portion of the support member 20 via opening 38, and with its other end attached to second pulley mounting bracket vertical member 30, the second pulley wheel 36 is suspended on spring 28 at a lower elevation than first pulley wheel 26.

A cable bracket 40 is fastened to the bottom end portion of vertical support member 20 for engaging and holding power cable 12. Cable bracket 40 includes a base member 42 having left and right end portions. A first inverted U-shaped member 44 has one end of the U fastened to the left end portion of base member 42 and a distal end portion inboard of the left end of base member 42. A second inverted U-shaped member 46 has one end of the U fastened to the right end portion of base member 42 and a distal end portion inboard of the right end of base member 42. The U-shaped members are positioned alongside one another with the distal end portions spaced a preselected distance from one another so as to form a slit through which the power cable can pass except for its head or connecting plug. One end of the slit may be wider than the other to accommodate different sizes of cables.

A stop member 48 is attached by welding or the like to one or both of support member 20 and cable bracket 40 and lies a preselected distance above cable bracket 40 to prevent the head or connecting plug of cable 12 from unintentionally retracting.

Referring to FIG. 3, another mounting bracket 50 has an inverted hook 52 on one end and a platform 54 on the other end. Hook 52 loops or drapes over joist 16 to support platform 54 and battery charger 18 that sits platform 54 to deliver electrical power via power cord 12.

Operation of the present invention is believed to be apparent from the foregoing description, but a few words will be added for emphasis. When charging is desired, the cart is driven into the shed and parked near a cable manager. A worker reaches up and grasps the head of the power cable to dislodge it from the cable bracket so that the cable can be pulled down. Pulling down on the cable causes the lower pulley to move downward against the force of the spring causing the spring to elongate and thereby tension. As the spring elongates, it also travels over the upper pulley. When a length of power cable has been pulled down, the lower pulley mounting bracket is fixed in its lowered position by engaging the lower S-hook and lower pulley wheel, or by engaging an opening the lower pulley wheel or its bracket with the stop member. Either way, the lower pulley wheel gets fixed in position to resist the upward pull of the spring. As the power cable is pulled downward, it rolls over the lower pulley wheel as it extends from the battery charger. When charging is completed, the power cable is disconnected from the golf cart and the lower pulley wheel is released. The spring forces the lower wheel upward pulling the power cable out of the path of the golf cart. To stop upward movement, the power cord is lodged in the cable bracket.

It can now be appreciated that a recharging station for a golf cart has been presented. It features a cable manager which manages a power cable for recharging an electric vehicle in a building which has a ceiling joist. The able managers comprises a vertical support member which has a top end portion and a bottom end portion with the top end portion defining first and second vertically spaced threaded bores and with the bottom end portion defining an opening. A mounting bracket has threaded members for engaging the threaded openings to mount the vertical support member. The mounting bracket is positioned on one side of the ceiling joist and the vertical support member is positioned on the other side of the ceiling joist so that the ceiling joist supports the vertical support member. A first pulley mounting bracket is fastened to the top end portion of the support member and a first pulley wheel is mounted on the first pulley mounting bracket. A second pulley wheel is mounted on a second pulley mounting bracket and the power cable is entrained about the second pulley wheel. A coil spring is entrained about the first pulley wheel. The spring has one end attached to the bottom end portion of the support member via the opening and has its other end attached to the second pulley mounting bracket. The second pulley wheel is suspended on the spring at a lower elevation than the first pulley wheel. A cable bracket is fastened to the bottom end portion of the vertical support member for engaging and holding the power cable. A mounting bracket has an inverted hook on one end and a platform on the other end. The hook is draped over the joist to support the platform and a battery charger on the platform containing the power cord.

While the invention has been described with particular reference to a golf cart, it is adaptable to other electric vehicles and to rechargeable electric machines. It will be understood by those skilled in the art that various changes may be made and equivalents may be substituted for elements of the preferred embodiment without departing from invention. For example, other retractile elements other than a coil spring may be used, or a coil spring may be combined with a cable or other element. A cable could more easily travel over the upper pulley wheel than the coil spring, and could be combined with a coil spring effectively. Also, a cable with a weight attached to end could be used in place of the coil spring. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. For example, a central battery charger may be used instead of the individual units illustrated. This is particularly true for golf cart and other vehicles that can be trickle charged overnight to maintain peak efficiency. A central system is easily incorporated into a new building. It is accordingly intended that the claims shall cover all such modifications and applications as do not depart from the true spirit and scope of the invention.

What is claimed is:

1. An apparatus, comprising:
   an elongated support having a top end portion and a bottom end portion;
   a first pulley wheel rotatably attached to said top end portion of said support member;
   a pulley mounting bracket;
   a second pulley wheel rotatably attached to said pulley mounting bracket; and
   a coil spring having a first end, a second end and a middle portion intermediate said ends, said first end being attached to said bottom end portion of said support member, said second end being attached to said pulley mounting bracket, said middle portion being entrained about said first pulley wheel to suspend said second pulley wheel at a lower elevation than said first pulley wheel.

2. An apparatus, as set forth in claim 1, wherein said support member has at least one threaded opening and including a support member mounting bracket having a threaded member for engaging said at least one threaded opening to mount said support member.

3. An apparatus, comprising:
   an elongated support member having a top end portion and a bottom end portion;
   a first pulley wheel rotatably attached to said top end portion of said elongated support member;
   a pulley mounting bracket;
   a second pulley wheel rotatably attached to said pulley mounting bracket;
   a retractile member having a first end, a second end and a middle portion intermediate said ends, said first end being attached to said bottom end portion of said elongated support member, said second end being attached to said pulley mounting bracket, said middle portion being entrained about said first pulley wheel to suspend said second pulley wheel at a lower elevation than said first pulley wheel; and
   a platform mounting bracket having an inverted hook on one end and a platform on the other end.

4. An apparatus, as set forth in claim 1, including means for releasably attaching said second pulley to said bottom end portion of said elongated support member.

5. An apparatus, comprising:
   an elongated support member having a top end portion and a bottom end portion;
   a first pulley wheel rotatably attached to said top end portion of said elongated support member;
   a pulley mounting bracket;
   a second pulley wheel rotatably attached to said pulley mounting bracket;
   a retractile member having a first end, a second end and a middle portion intermediate said ends, said first end being attached to said bottom end portion of said support member, said second end being attached to said pulley mounting bracket, said middle portion being entrained about said first pulley wheel to suspend said second pulley wheel at a lower elevation than said first pulley wheel; and
   an electrical power cable entrained about said second pulley wheel.

6. An apparatus, as set forth in claim 5, including a cable bracket fastened to said bottom end portion of said elongated support member for engaging and holding said electrical power cable.

7. An apparatus, as set forth in claim 1, including a cable bracket fastened to said bottom end portion of said elongated support member for engaging and holding an electrical power cable.

8. An apparatus, as set forth in claim 7, wherein said cable bracket includes:
   a base member having left and right end portions;
   a first inverted U-shaped member having one end of the U fastened to said left end portion of said base member and a distal end portion; and
   a second inverted U-shaped member having one end of the U fastened to said right end portion of said base member and a distal end portion, said U-shaped members being positioned alongside one another with said distal end portions spaced a preselected distance from one another.

9. An apparatus, as set forth in claim 8, including a stop member attached to one of said elongated support member and cable bracket and lying a preselected distance above said cable bracket.

10. An apparatus, comprising:
    an elongated support member having a top end portion and a bottom end portion, said bottom end portion defining an opening;
    a first pulley mounting bracket attached to said top end portion of said elongated support member;
    a first pulley wheel mounted on said first pulley mounting bracket;
    a second pulley mounting bracket;
    a second pulley wheel mounted on said pulley mounting bracket; and
    a coil spring entrained about said first pulley wheel and having one end attached to said bottom end portion of said elongated support member via said opening and having its other end attached to said second pulley mounting bracket, said second pulley wheel being suspended on said spring at a lower elevation than said first pulley wheel.

11. An apparatus, as set forth in claim 10, wherein said top end portion of said support member defines first and second vertically spaced threaded bores, and including a support member mounting bracket having threaded members for engaging said threaded openings to mount said support member.

12. An apparatus, as set forth in claim 10, including a platform mounting bracket having an inverted hook on one end and a platform on the other end.

13. Apparatus, as set forth in claim 10, including an electrical power cable entrained about said second pulley wheel.

14. An apparatus, as set forth in claim 13, including a cable bracket fastened to said bottom end portion of said elongated support member for engaging and holding said electrical power cable.

15. An apparatus, as set forth in claim 10, including a cable bracket fastened to said bottom end portion of said elongated support member for engaging and holding an electrical power cable.

16. An apparatus, as set forth in claim 15, wherein said cable bracket includes:

a base member having left and right end portions;

a first inverted U-shaped member having one end of the U fastened to said left end portion of said base member and a distal end portion; and a second inverted U-shaped member having one end of the U fastened to said right end portion of said base member and a distal end portion, said U-shaped members being positioned alongside one another with said distal end portions spaced a preselected distance from one another.

17. An apparatus, as set forth in claim 16, including a stop member attached to one of said support member and cable bracket and lying a preselected distance above said cable bracket.

18. An apparatus for managing a power cable for recharging an electric vehicle in a building, said building having a ceiling joist, said apparatus comprising:

a vertical support member having a top end portion and a bottom end portion, said top end portion defining first and second vertically spaced threaded bores, said bottom end portion defining an opening;

a support member mounting bracket having threaded members for engaging said threaded openings to mount said vertical support member, said support member mounting bracket being positioned on one side of the ceiling joist and said vertical support member being positioned on the other side of the ceiling joist so that the ceiling joist supports said vertical support member;

a first pulley mounting bracket fastened to said top end portion of said support member;

a first pulley wheel mounted on said first pulley mounting bracket;

a second pulley mounting bracket;

a second pulley wheel mounted on said pulley mounting bracket with the power cable entrained about said second pulley wheel;

a coil spring entrained about said first pulley wheel and having one end attached to said bottom end portion of said support member via said opening and having its other end attached to said second pulley mounting bracket, said second pulley wheel being suspended on said spring at a lower elevation than said first pulley wheel; and a cable bracket fastened to said bottom end portion of said vertical support member for engaging and holding the power cable.

19. An apparatus, as set forth in claim 18, including a platform mounting bracket having an inverted hook on one end and a platform on the other end, said hook being draped over the joist to support said platform and a battery charger on said platform containing the power cord.

* * * * *